United States Patent
Maas

[15] 3,639,015
[45] Feb. 1, 1972

[54] RESILIENT MOUNTING ARRANGEMENT

[72] Inventor: Otto Robert Maas, Russelsheim/Hessen, Germany

[73] Assignee: General Motors Corporation, Detroit, Mich.

[22] Filed: May 4, 1970

[21] Appl. No.: 34,438

[30] Foreign Application Priority Data

May 10, 1969 Germany.................G 69 19 078.9

[52] U.S. Cl....................................308/26, 308/184
[51] Int. Cl.................................................F16c 35/06
[58] Field of Search...........308/26, 184; 248/6, 8, 9, 15, 248/20, 21, 22, 54, 204, 358

[56] References Cited

UNITED STATES PATENTS

| 2,933,354 | 4/1960 | Primeau | 308/184 |
| 1,603,348 | 10/1926 | Lord | 308/26 |
| 2,906,572 | 9/1959 | Wroby | 308/184 |
| 3,140,901 | 4/1964 | Young | 308/26 |
| 3,306,679 | 2/1967 | Stokely | 308/26 |

FOREIGN PATENTS OR APPLICATIONS

| 921,720 | 3/1963 | Great Britain | 308/26 |

Primary Examiner—Martin P. Schwadron
Assistant Examiner—Barry Grossman
Attorney—W. E. Finken and F. J. Fodale

[57] ABSTRACT

A propeller shaft bearing is carried in an inner ring connected to an outer ring by a resilient annular membrane. The outer ring is secured to a vehicle body portion. An annular member extends from one of the rings towards the other and upon relative displacement of the rings resiliently engages the other ring to provide an increased spring rate for the membrane to resist further relative displacement of the rings.

3 Claims, 3 Drawing Figures

PATENTED FEB 1 1972

3,639,015

Inventor
*Otto Robert Maas*
BY
*F. J. Fodale*
Attorney

RESILIENT MOUNTING ARRANGEMENT

This invention relates to a resilient mounting arrangement such as may be used to support a bearing for a propeller shaft of a motor vehicle drive line.

In a motor vehicle drive line for transmitting rotary drive from an engine of the vehicle to a pair of opposed road wheels of the vehicle, relative movement between the vehicle and the drive line can cause axial or angular movement of a propeller shaft forming part of the drive line, with consequent transmission of vibrations to the vehicle.

By the invention there is provided a resilient mounting arrangement for a propeller shaft bearing of a motor vehicle, which arrangement limits and dampens such vibrations caused by axial or angular movement of the propeller shaft.

The appended claims define the scope of the invention. How the invention can be performed is hereinafter particularly described with reference to the accompanying drawings in which:

Figure 1:
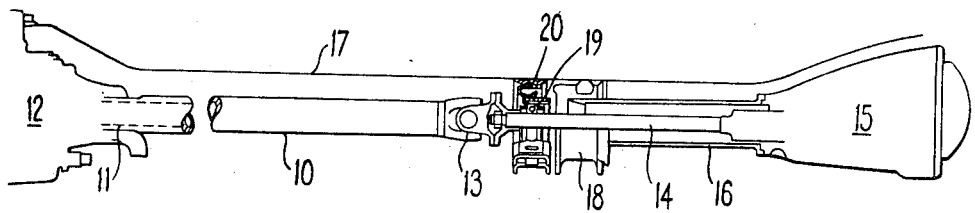
FIG. 1 is a schematic view, partly in section, of a motor vehicle drive line including a resilient mounting arrangement according to the invention.

A motor vehicle drive line for transmitting rotary drive from an engine of a vehicle (not shown) to opposed ones of a pair of rear road wheels of the vehicle (not shown) which are interconnected by a rigid rear axle suspended from the vehicle, includes a divided propeller shaft 10, 14. The shaft 10 is connected at a forward end by a sliding coupling 11 to a gear box 12, in unit with the engine. At its rear end the shaft 10 is connected by a universal joint 13 to a shaft 14 which is also connected to a differential gear 15 for transmitting the rotary drive to the rear road wheels of the vehicle. As the rear axle, suspension and rear road wheels, and the engine form no part of the invention they are not shown in the drawing nor will they be further described.

The shaft 14 is enclosed over the greater part of its length within a tubular extension 16 of the rear axle (not shown), and the extension 16 is secured at its forward end in a resilient bushing 18 which is secured to a part 17 of a transmission tunnel formed in the floor pan of the vehicle body.

A bearing 19 is located between the universal joint 13 and the bushing 18 and carries the shaft 14. The bearing 19 is resiliently mounted in an arrangement secured to the part 17 of the transmission tunnel of the vehicle. The bearing 19 has an inner race 21 which carries the shaft 14, and an outer race 23, and balls 22 retained between the two races. The bearing 19 is secured in a bearing cage 24 which encloses the race 23. The resilient mounting arrangement 20 for the bearing consists of a rigid metal inner ring 25 which surrounds the bearing cage 24 and has a coating of an elastomeric material thereon to prevent metal-to-metal contact between the ring and the cage. An outer rigid metal ring 26 surrounds the inner ring 25 and is spaced therefrom. The rings 25 and 26 are cylindrical. An annular resilient support membrane 27, of C-shaped cross section, interconnects the rings 25 and 26, and is bonded as by vulcanizing to the respective rings. The membrane 27 has on its end portion bonded on the inner ring 25 an annular frustoconical member 28 which extends from the inner ring 25 towards the outer ring 26.

Figure 3:
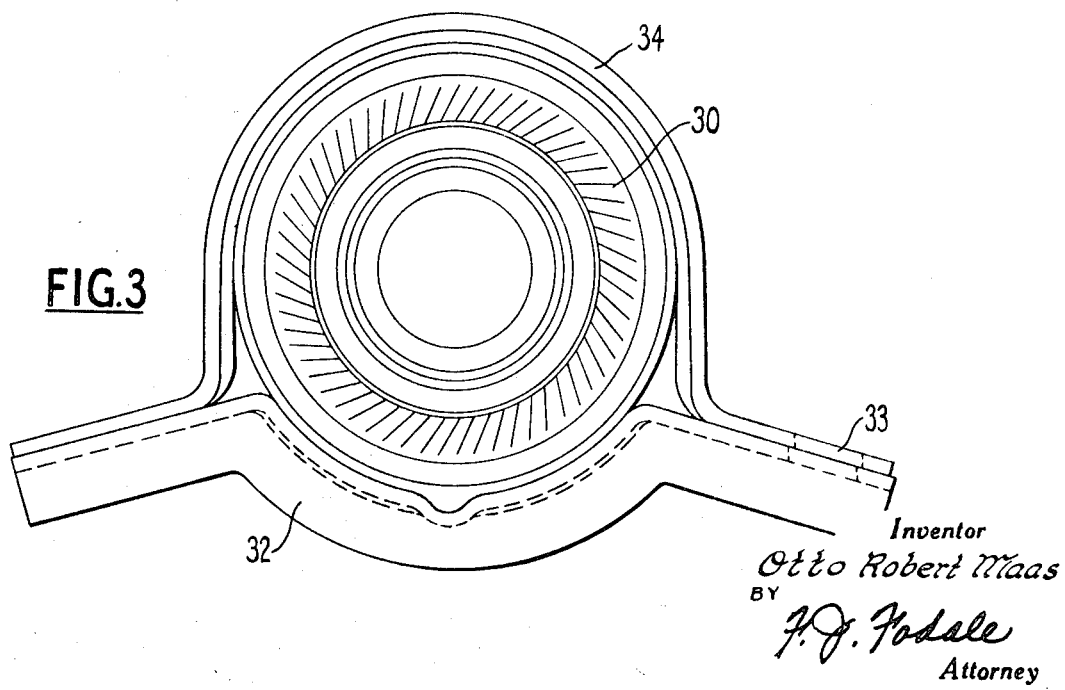
FIG. 3 is an end view of the resilient mounting arrangement of FIG. 2.

The annular member 28 has a surface portion facing the inner ring 25 and has ribs 30 formed on that portion. As best seen in FIG. 3 these ribs extend obliquely and are so positioned as to lie substantially tangentially of the outer surface of the shaft 14 when it is located in the bearing 19.

The arrangement 20 is asymmetric in that the membrane 27 is disposed at one end of the arrangement directed towards the front of the vehicle and the other end of the arrangement is open towards the rear of the vehicle. A seal lip 31 formed on the membrane 27 engages the bearing cage 24.

The arrangement 20 is secured to the portion 17 of the vehicle by means of hanger bolts (not shown). A rigid M-shaped connecting piece 32 fits around a portion of the outer ring 26, and its end portions forming the outer limbs of the M have slots 33 for reception of the bolts. A steel band 34 fitted around the other portion of the ring 26 is welded to the connecting piece 32.

Figure 2:
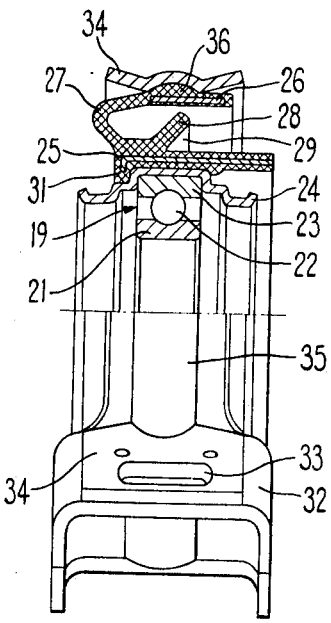
FIG. 2 is a part-sectioned view to a larger scale of the resilient mounting arrangement of FIG. 1.

As seen in FIG. 2 the steel band 34 has an annular depression 35 therein into which fits an annular bead 36 on the outer portion of the membrane 27 to secure the arrangement 20 against axial movement.

To avoid any metal-to-metal contact between the inner ring 25 and the bearing cage 24, the outer ring 26 and the steel band 34, or the connecting piece 32, the rings are coated with elastomeric material. The membrane 27 can provide some part of this covering.

The arrangement 20 as shown in FIG. 1 has its closed end facing forwardly, because when fitted the other way round it is possible for dirt flung up by the front wheels of the vehicle to enter the arrangement and damage it.

Although the annular member 28 has been shown as extending from the inner ring 25 towards the outer ring 26, it could be formed to extend from the outer ring, towards the inner ring. Also, although the member 28 has been shown as a part of the membrane 27 it could be a separate element. In all cases, it is important that the member 28 has its greatest radial dimension at a point substantially midway along the length of the arrangement 20.

In operation, the forward shaft 10 of the drive line is severely stressed by movement of the rear axle which is in part located and guided by the extension 16 and the extension transmits such axle movements to the shaft 14 and so through the universal joint 13 to the shaft 10.

The resilient mounting arrangement 20 must be able to absorb both the angular movements of the drive line and also its axial movement so that noises and vibration caused thereby are reduced or obviated. Axial movement of the shafts 10, 14 occurs for example during braking of the vehicle and are due to the resilient mounting of the engine and gear box. The sliding coupling 11 allows for such axial movement at the shaft connection to the gear box, and the resilient mounting arrangement allows for this movement at the bearing 19. By such movement the inner ring 25 is pushed out of its rest position as seen in FIG. 2, in the direction of movement of the shafts 10, 14 while the outer ring 26 remains in the position shown. The membrane 27 connecting the rings is stressed, and its cross-sectional shape is varied as the membrane deforms in response to the stress imparted by movement of the ring 25.

If, for example, the shafts 10, 14 move in an axial direction towards the gear box 12, then the membrane 27 is deformed from the rest position shown in FIG. 2 so that under severe axial movements the membrane 27 is so deformed that the annular member 28 rests against it thus stiffening it and providing additional damping to reduce such axial movements.

The membrane 27 also deforms to take up angular movements of the drive line. In such a case the position of the inner ring 25 is varied in the sense of the angular movements of the drive line. In its rest position the inner ring 25 is concentric with the outer ring 26. Variation of the angular position of the inner ring 25 is resisted by resilient engagement of the annular member 28 with the outer ring 26, which engagement provides additional damping to that from the deformation of the membrane 27. The positioning of the ribs 30 enables a desired damping character. In the specific embodiment described above a tangential arrangement of rib was found to be advantageous. However, in other applications a different positioning of rib, or a different shape of rib, curved instead of straight for example, could be more advantageous.

The annular member 28 in effect increases the spring rate of the membrane 27.

What is claimed is:

1. A resilient mounting arrangement comprising:
an inner ring adapted to carry a bearing;
a bearing carried by said inner ring;
an outer rigid metal ring spaced from said inner ring;

an elastomeric coating on said outer ring, said coating including an annular outwardly protruding bead used in mounting the outer ring on a body portion of a vehicle;

a single annular elastomeric support membrane, of C-shaped cross section, interconnecting said coating and outer rigid metal ring with said inner ring;

an annular frustoconical member extending from one of said rings towards the other of said rings and movable, on displacement of said rings relative to one another, into resilient engagement with said other ring to thereby provide an increase in spring rate of said membrane to resist further relative displacement of said rings.

2. A resilient mounting arrangement comprising:
an inner rigid metal ring adapted to carry a bearing;
a bearing carried in said inner ring;
an outer rigid metal ring spaced from said inner ring and adapted to be mounted on a body portion of a vehicle;
an elastomeric coating on each of said rings;
a single annular elastomeric support membrane, of C-shaped cross section, continuous with said coatings interconnecting said rings;
an annular frustoconical member formed on said membrane and coatings;
said member extending from said inner ring towards said outer ring and having a maximum radial dimension midway along the axial length of said arrangement, said member being movable on displacement of said rings relative to one another, into resilient engagement with said outer ring to thereby provide an increase in spring rate of said membrane to resist further relative movement of said rings;
said member having a surface portion facing said inner ring, which portion is compressively deformable upon said resilient engagement of said member with said outer ring;
and ribs formed on said surface portion and effective to stiffen said member against said deformation.

3. In a motor vehicle drive line assembly having a propeller shaft adapted to transmit rotary drive from an engine to a pair of road wheels of the vehicle a resilient mounting arrangement comprising:
an inner ring adapted to carry a bearing;
a bearing carried in said inner ring and adapted to support said propeller shaft;
an outer ring spaced from said inner ring and adapted to be mounted on a body portion of a vehicle;
mounting means surrounding said outer ring, said mounting means being secured to said body portion of said vehicle;
an annular support membrane, of C-shaped cross section, interconnecting said rings;
an annular frustoconical member formed on said membrane and extending from said inner ring towards said outer ring and movable, on displacement of said rings relative to one another, into resilient engagement with said other ring to thereby provide an increase in spring rate of said membrane to resist further relative displacement of said rings;
said member having a surface portion facing said inner ring, which portion is compressively deformable upon said engagement of said member with said outer ring;
and ribs formed on said surface portion and extending generally tangentially of the external surface of said propeller shaft supported in said bearing, said ribs being effective to stiffen said member against said deformation;
said member having a maximum radial dimension midway along the axial length of said arrangement.

* * * * *